United States Patent
Banno et al.

(10) Patent No.: US 7,222,923 B2
(45) Date of Patent: May 29, 2007

(54) VEHICLE WHEEL SPEED ESTIMATION DEVICE, VEHICLE BODY SPEED ESTIMATION DEVICE AND VEHICLE BEHAVIOR CONTROL APPARATUS

(75) Inventors: Masaki Banno, Nagoya (JP); Hiroshi Matsuoka, Toyota (JP); Shinichi Tagawa, Kariya (JP)

(73) Assignee: Advics Co., Ltd., Kariya (JP)

( * ) Notice: Subject to any disclaimer, the term of this patent is extended or adjusted under 35 U.S.C. 154(b) by 0 days.

(21) Appl. No.: 10/911,587

(22) Filed: Aug. 5, 2004

(65) Prior Publication Data

US 2005/0046274 A1    Mar. 3, 2005

(30) Foreign Application Priority Data

Aug. 26, 2003    (JP)    ............................. 2003-301419

(51) Int. Cl.
*B60T 8/32*    (2006.01)
(52) U.S. Cl. ....................... 303/169; 303/170
(58) Field of Classification Search ................ 303/140, 303/146, 169, 170, 187, 188
See application file for complete search history.

(56) References Cited

U.S. PATENT DOCUMENTS

| 5,828,975 A * | 10/1998 | Isshiki et al. ................. 701/72 |
| 5,857,754 A * | 1/1999 | Fukami et al. .............. 303/146 |
| 5,934,770 A * | 8/1999 | Okazaki ..................... 303/150 |
| 6,023,649 A * | 2/2000 | Matsuura et al. ............. 701/71 |
| 6,064,930 A * | 5/2000 | Shibahata .................... 701/36 |
| 6,212,462 B1 * | 4/2001 | Ohtsu et al. ................. 701/72 |
| 6,304,807 B1 * | 10/2001 | Kirchberger et al. ......... 701/72 |
| 6,334,655 B2 * | 1/2002 | Tanaka et al. ........... 303/113.4 |
| 6,473,682 B1 * | 10/2002 | Nakamura ................... 701/74 |

FOREIGN PATENT DOCUMENTS

| DE | 19714968 A1 | 10/1997 |
| JP | A-09-86367 | 3/1997 |
| JP | B-3412363 | 3/2003 |

OTHER PUBLICATIONS

Translation of the Official Letter dated Aug. 26, 2005.
Comments dated Oct. 13, 2005.

* cited by examiner

*Primary Examiner*—Christopher P. Schwartz
(74) *Attorney, Agent, or Firm*—Posz Law Group, PLC

(57) ABSTRACT

In a case where one of a left and right pair of drive wheels is a non-controlled wheel to which braking force of a vehicle behavior control is not applied, and the other of the drive wheels is a controlled wheel to which braking force is applied, a detected vehicle wheel speed for the non-controlled wheel is corrected to a smaller value in accordance with increase in the roll angle, and increase in the braking force of the controlled wheel when a roll angle of a vehicle body is larger than a threshold value. In a vehicle behavior control, when lateral G acts upon the vehicle during turning, braking force is applied to the controlled wheel that is at the outside of the turn. This braking force application causes driving force of the controlled wheel to be partially transferred to the non-corrected wheel that is at the inside of the turn, whereby the vehicle wheel speed of the non-corrected wheel is increased. Accordingly, in the present invention, correction calculation is performed.

13 Claims, 5 Drawing Sheets

VEHICLE WHEEL SPEED ESTIMATION DEVICE, VEHICLE BODY SPEED ESTIMATION DEVICE AND VEHICLE BEHAVIOR CONTROL APPARATUS

CROSS REFERENCE TO RELATED APPLICATION

This application is based upon and claims the benefit of Japanese patent application No. 2003-301419 filed on Aug. 26, 2002, the content of which are incorporated herein by reference.

FIELD OF THE INVENTION

The present invention relates to a vehicle wheel speed estimation device for estimating a wheel speed of a vehicle, a vehicle body speed, estimation device for estimating vehicle body speed and a vehicle behavior control apparatus for stabilizing vehicle behavior.

BACKGROUND OF THE INVENTION

A free rotational speed estimation device is known (for example, Japanese Patent No. 3412363) that calculates a vehicle body speed and respective free rotational speeds of vehicle wheels of a vehicle ("free rotational speed" as used here refers to the rotational speed of each vehicle wheel when no braking force is applied). The calculated results of this free rotational speed estimation device are utilized in a vehicle behavior control apparatus that stabilizes vehicle behavior by controlling the braking force of each vehicle wheel. With this known free rotational speed estimation device, the free rotational speed of each vehicle wheel is estimated based upon (i) respective vehicle wheel speeds when a braking force control apparatus is not applying braking force to the vehicle wheels, or (ii) the vehicle body speed at that time.

In normal vehicles, such as two-wheel or four-wheel drive vehicles, drive torque is transmitted to a left and right pair of drive wheels, respectively, via a differential. The key characteristics of such general-use differentials are as follows. (1) When respective vertical loads of the left and right drive wheels is different, drive torque of the drive wheel with greater vertical load is partially transferred to the drive wheel with the smaller vertical load by the differential. Accordingly, the drive torque of the drive wheel with smaller vertical load is increased. (2) When there is a difference in the braking force applied to the left and right drive wheels, drive torque of the drive wheel subject to the larger braking force is partially transferred to the drive wheel subject to the smaller braking force. Accordingly, the drive torque of the drive wheel subject to smaller braking force is increased.

When high lateral acceleration is acting on a vehicle during turning, the vertical load of the drive wheel at the outside of the turning direction (hereinafter referred to as the "outside wheel") becomes lower than the vertical load of the other drive wheel at the inside of the turning direction (hereinafter referred to as the "inside wheel"). However, given the characteristics of the differential described above, drive torque of the outside wheel with the larger vertical load can be partially transferred to the inside wheel with the smaller vertical load, whereby the drive torque of the inside wheel is increased. In addition, on some occasions, in order to perform vehicle behavior control, braking force is applied to the outside wheel among the pair of drive wheels when high lateral acceleration is acting in the above described manner. In this case, the characteristics of the differential cause even more of the drive torque from the outside wheel to be transferred to the inside wheel. As a result, the drive torque of the inside wheel is increased substantially.

When the drive torque of the inside wheel of the pair of left and right drive wheels is increased in this way, acceleration slip occurs, whereby a rotational speed of the inside wheel (i.e., a vehicle wheel speed) that is detected by a vehicle wheel speed detection unit increases. This vehicle wheel speed, in the form of a sensor output, is larger than an actual vehicle body speed at the inside wheel position. Therefore, a vehicle body speed estimated based on the vehicle wheel speed of the inside wheel in this manner is larger than the actual vehicle body speed. In other words, a slip ratio of the vehicle wheel speed of the inside wheel increases.

However, in the related art, the fact that the vehicle wheel speed increases due to increase in the drive torque of the inside wheel when high lateral acceleration is acting is not taken into consideration. Accordingly, the vehicle wheel speed and the vehicle body speed that are obtained are not accurate. When vehicle behavior control is perform based upon these inaccurate parameters, there are occasions when the resultant vehicle behavior stabilization effect is inadequate.

SUMMARY OF THE INVENTION

It is an object of the invention to provide a vehicle wheel speed estimation device that can estimate a vehicle wheel speed of an inside wheel of a vehicle when high lateral acceleration is acting thereupon. This inside wheel is located at an inside of a turning direction of the vehicle.

It is a further object of the invention to provide a vehicle body speed estimation device that can estimate a vehicle body speed based on a vehicle wheel speed of an inside wheel of a vehicle when high lateral acceleration is acting thereon, this inside wheel being located at an inside of a turning direction of the vehicle.

Moreover, it is a further object of the invention to provide a vehicle behavior control apparatus that can stabilize vehicle behavior based upon a vehicle wheel speed and a vehicle body speed that are estimated while high lateral acceleration is acting on a vehicle.

According to a first aspect of the invention, among a pair of left and right drive wheels, one of the drive wheels is taken to be a controlled wheel to which braking force is applied, and the other of the drive wheels is taken to be a non-controlled wheel to which braking force is not applied. A magnitude of a detected actual vehicle wheel speed of the non-controlled wheel is corrected to a smaller value based on the driving force applied to the controlled wheel. Note that, on some occasions, drive torque of the controlled wheel that is one of the drive wheels is partially transferred to the non-controlled wheel that is the other one of the drive wheels. Resultantly, the drive torque of the non-controlled wheel is increased, whereby the vehicle wheel speed of the non-controlled wheel is increased such that it become larger than the vehicle body speed at the position of the non-controlled wheel. However, according to the invention, it is possible to correct the vehicle wheel speed of the non-controlled wheel to a smaller value in accordance with the braking force applied to the controlled wheel. Accordingly, it is possible to correct the vehicle wheel speed of the non-controlled wheel to be closer to an actual vehicle body speed at the position of the non-controlled wheel. The vehicle wheel speed obtained by the invention may be utilized, for example in a braking control that performs vehicle behavior stability control or the like. Such braking controls are based upon vehicle body speed, and thus application of the invention makes it possible to improve brake control performance.

According to a second aspect of the invention, among a pair of left and right drive wheels, one of the drive wheels is taken to be a controlled wheel to which braking force is applied, and the other of the drive wheels is taken to be a non-controlled wheel to which braking force is not applied. A magnitude of a detected actual vehicle wheel speed of the non-controlled wheel is corrected to a smaller value based on a physical quantity that corresponds to a difference of a vertical load of the controlled wheel and a vertical load of the non-controlled wheel. Note that, on some occasions, drive torque of the controlled wheel that is the drive wheel with larger vertical load is partially transferred to the non-controlled wheel that is the drive wheel with smaller vertical load. Resultantly, the drive torque of the non-controlled wheel is increased, whereby the vehicle wheel speed of the non-controlled wheel with the smaller vertical load is increased such that it becomes larger than the vehicle body speed at a vehicle wheel position of the non-controlled wheel. However, according to the invention, the vehicle wheel speed of the non-controlled wheel is corrected to a smaller value in accordance with the vertical load of the controlled wheel. Accordingly, it is possible to correct the vehicle wheel speed of the non-controlled wheel to be closer to the actual vehicle body speed at the position of the non-controlled wheel. The vehicle wheel speed obtained by the invention may be utilized, for example in a braking control that performs vehicle behavior stability control or the like. Such braking controls are based upon vehicle body speed, and thus application of the invention makes it possible to improve brake control performance.

Note that, the vehicle wheel speed of the non-controlled wheel may be corrected to a smaller value based on (i) the braking force applied to the controlled wheel, and (ii) a physical amount that corresponds to a vertical load difference between the controlled wheel and the non-controlled wheel.

In this case, in contrast to the actual vehicle wheel speed of the non-controlled wheel (that is one of the drive wheels) that increases more than the vehicle body speed at the position of the non-controlled wheel, the vehicle wheel speed of the non-controlled wheel can be corrected to a smaller value in accordance with increase in one or both of (a) the physical quantity that corresponds to the vertical load difference between the left and right drive wheels, and (b) the braking force applied to the controlled wheel (that is the other one of the left and right drive wheels). Accordingly, it is possible to make the vehicle wheel speed of the non-controlled wheel closer to the vehicle body speed at the position of the non-controlled wheel.

Note that, the physical quantity that corresponds to the vertical load may be either one of a roll angle and a lateral acceleration of the vehicle. In other words, the respective surface ground loads of the left and right drive wheels become different when, for example, the vehicle is running on a road with a steady gradient in a direction perpendicular to vehicle proceeding direction, or is turning on a level road. In the later case, the roll angle of the vehicle or the lateral acceleration that acts thereon is dependent on the turning direction. Accordingly, as compared to when the vehicle is running straight, the vertical load of the wheel at the outside of the turn is increased, and the vertical load of the wheel at the inside of the turn is decreased. The difference in the vertical loads that results is correlated with the roll angle and the lateral acceleration. Thus, it is possible to take the roll angle or the lateral acceleration as the physical quantity that corresponds to the vertical load difference.

Moreover, the vehicle wheel speed of the non-controlled wheel that has been corrected in this way by the vehicle wheel speed estimation device may be used to estimate the vehicle body speed of the vehicle. By doing so, it is possible to improve the accuracy with which the vehicle body speed is estimated.

Further, a vehicle body speed estimation device according to the invention may be provided in a vehicle behavior control apparatus. In this case, control of vehicle behavior can be based on a vehicle body speed that is estimated by the vehicle body speed estimation device, whereby it is possible to improve the characteristics of the behavior control of the vehicle.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

Figure 1:
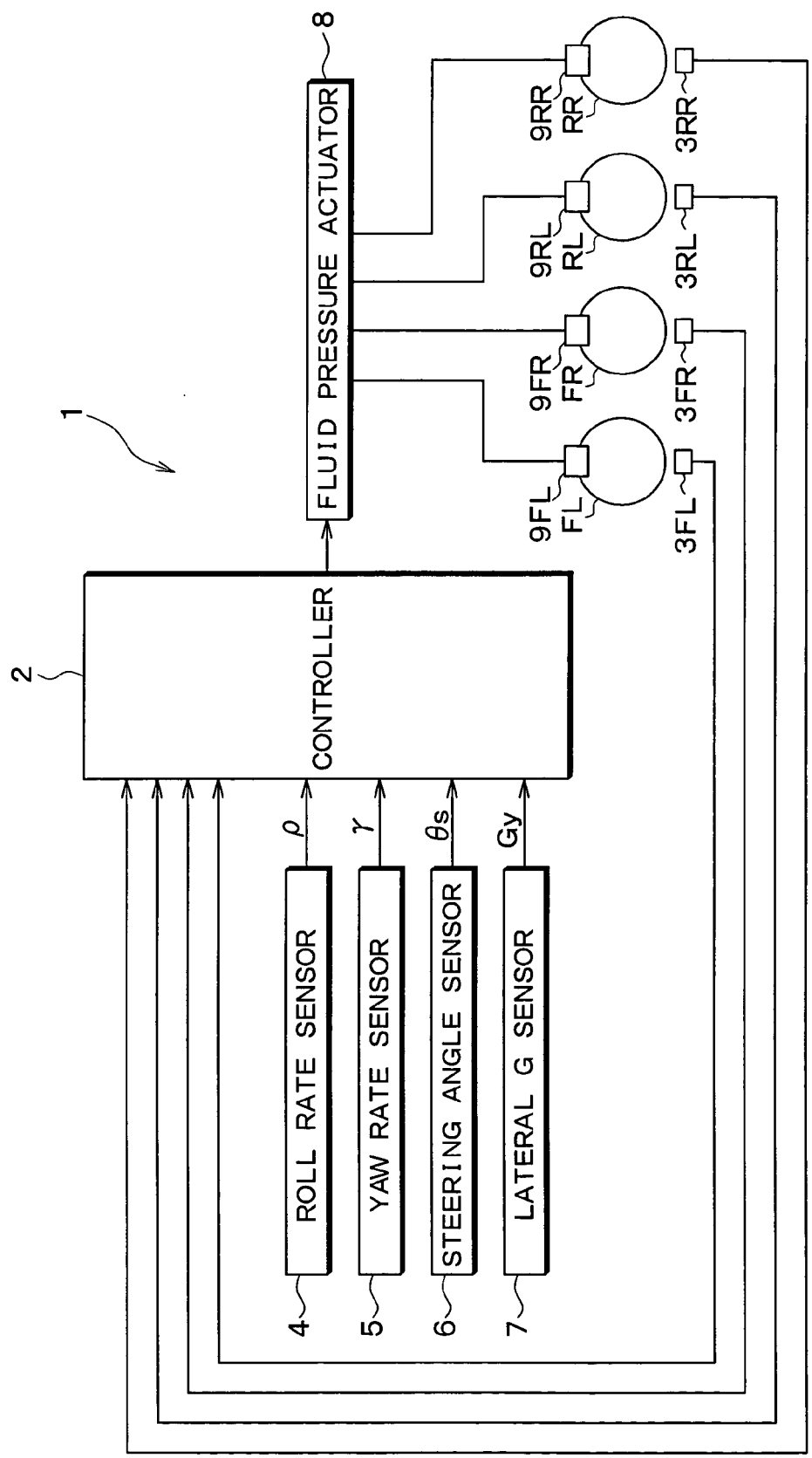
FIG. 1 is a schematic representation of a vehicle behavior control apparatus that acts as a braking force control apparatus of an embodiment of the invention.

The present invention will be described further with reference to various embodiments in the drawings.

Hereinafter, an embodiment of the invention will be explained with reference to the drawings. FIG. 1 is a schematic representation of a vehicle behavior control apparatus 1 that acts as a braking force control apparatus that is provided with a vehicle wheel speed estimation device of an embodiment of the invention. This vehicle behavior control apparatus 1 can select, at the least, one of four vehicle wheels FL, FR, RL and RR, and perform control of a braking force of the selected vehicle wheel so as to stabilize vehicle behavior. Note that, more specifically, the front left wheel is denoted as FL, the front right wheel as FR, the rear left wheel as RL, and the rear right wheel as RR.

The vehicle behavior control apparatus 1 of the embodiment includes a controller 2 that is configured from a microcomputer.

The vehicle behavior control apparatus 1 includes vehicle wheel sensors 3FL to 3RR, a roll rate sensor 4, a yaw rate sensor 5, a steering angle sensor 6, and a lateral acceleration (lateral G) sensor 7. The vehicle wheel sensors 3FL to 3RR output respective detection signals that correspond to vehicle wheel speeds VWFL to VWRR of each vehicle wheel FL to RR. The roll rate sensor 4 outputs a detection signal that corresponds to an angular velocity about a roll axis of the vehicle, namely, a roll rate $\rho$ that is a roll angular velocity. The yaw rate sensor 5 outputs a detection signal that corresponds to an angular velocity about a yaw axis of the vehicle, namely, a yaw rate axis of the vehicle, namely, a yaw rate γ that is a yaw angular velocity. The steering angle sensor 6 outputs a detection signal that corresponds to a steering angle θs of a steering wheel (not shown). The lateral G sensor 7 outputs a detection signal that corresponds to an acceleration in a lateral direction of the vehicle (hereinafter referred to as "lateral acceleration") Gy.

The vehicle wheel sensors 3FL to 3RR, the roll rate sensor 4, the yaw rate sensor 5, the steering angle sensor 6, and the lateral G sensor 7 are respectively connected to a controller 2 such that the respective detection signal are output thereto. The detection signals undergo signal processing in the controller 2, and are then utilized as respective sensor detection values when a control program, described hereinafter, is performed.

When necessary, the controller 2 uses the sensor detection signals to perform vehicle wheel speed estimation based on a vehicle wheel speed correction calculation. In addition, the controller 2 performs a vehicle behavior control in order to stabilize vehicle behavior. To achieve this, the controller 2 independently controls a fluid pressure of a wheel cylinder in each vehicle wheel FL to RR (namely, a braking force) based on the sensor detection signals. Note that, hereinafter, the wheel cylinders will be referred to as "W/C".

The vehicle behavior control apparatus 1 is provided with a fluid pressure actuator 8 that is connected to the controller 2. The fluid pressure actuator 8 receives a signal indicating a fluid pressure control amount that corresponds to a braking force that is a target braking force for each vehicle wheel Fl to RR. This fluid pressure control amount is calculated by the controller 2. Then, the fluid pressure actuator 8 controls each wheel cylinder pressure (which is the fluid that is applied to each wheel cylinder 9FL to 9RR of each wheel FL to RR) so that the braking force is generated for each wheel FL to RR. Note that, hereinafter, the wheel cylinder pressure will be referred to as "W/C pressure".

Figure 2:
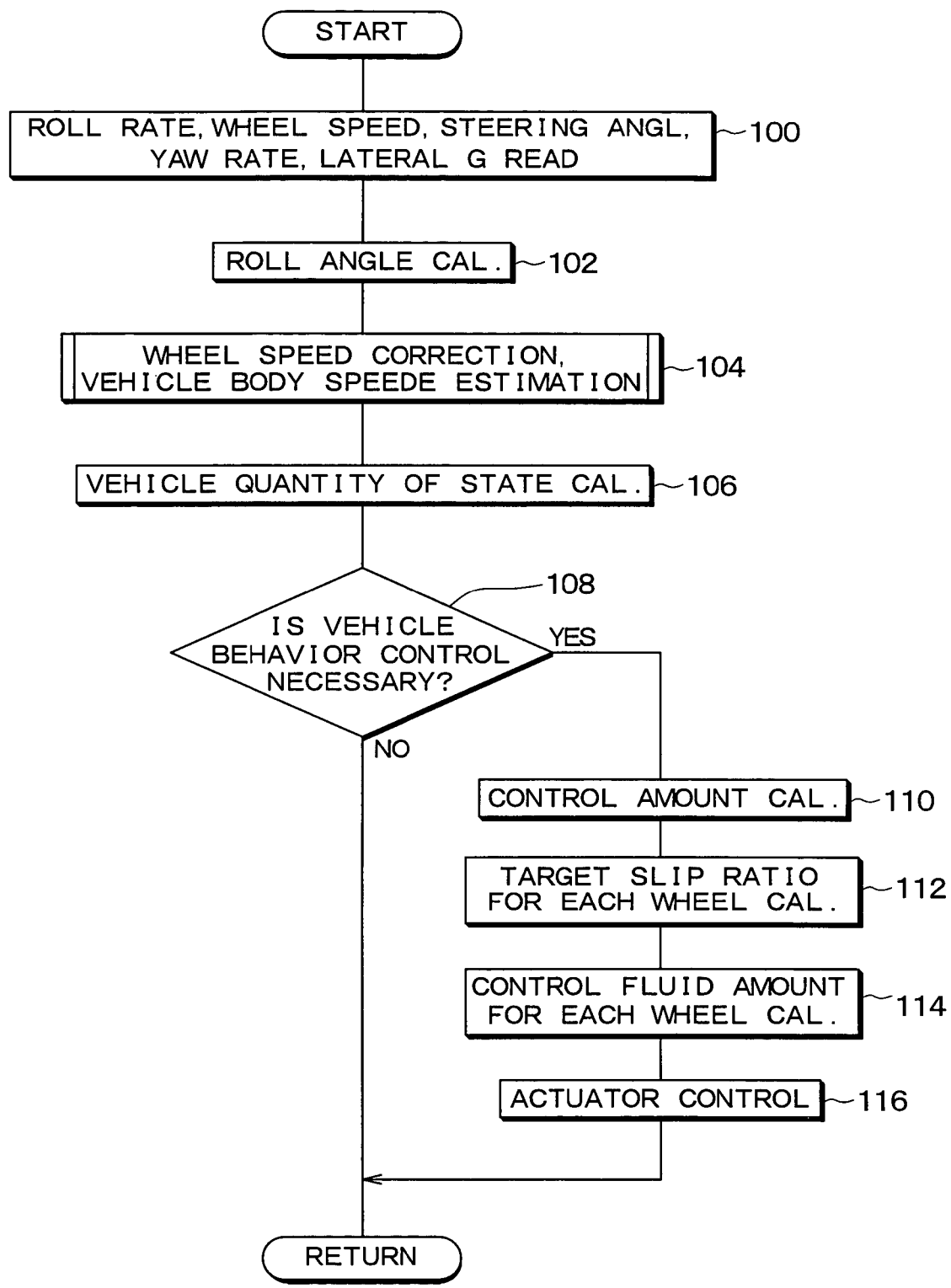
FIG. 2 is a flow chart illustrating a main routine of a vehicle behavior control performed by a controller.

Hereinafter, an operation of the vehicle behavior control apparatus 1 of this embodiment is described. FIG. 2 is a flow chart illustrating a main routine of the vehicle behavior control performed by the controller 2. Control processing of the main routine shown in FIG. 2 starts when an ignition switch, not shown, is turned on, and repeated with a predetermined operation period.

At 100, the controller 2 reads the roll rate ρ; the vehicle wheel speeds VWi (i is FL, FR, RL and RR) of the respective wheels FL, FR, RL and RR; the steering angle θs; the yaw rate γ; and the lateral acceleration Gy, which are based on the respective sensor detection signals. Then, at 102, a roll angle φ is calculated by integrating the read roll rate ρ by each operation period. The roll angle φ becomes larger as a vertical load difference between the left vehicle wheels FL and RL and right vehicle wheels FR and RR becomes larger. Accordingly, the roll angle φ is a physical value that corresponds to the vertical load difference of the left vehicle wheels FL and RL and the right vehicle wheels FR and RR.

At 104, vehicle wheel speed correction processing, described later, is performed for left and right drive wheels. The vehicle wheel speed of an inside wheel among the left and right drive wheels is corrected. Moreover, a vehicle body speed VB is estimated based on (i) a detection value for the corrected vehicle wheel speed and (ii) detection values for respective vehicle wheel speeds of the other vehicle wheels.

At 106, a vehicle quantity of state SV is calculated using Equation 1 below. The vehicle quantity of state SV is obtained as the difference of a steering angle yaw rate γst and an actual yaw rate (real yaw rate) γ.

Equation 1

$$SV = \gamma st - \gamma \quad (1)$$

The steering angle yaw rate γst is a yaw rate that is calculated from a steering angle θst based on Equation 2 below.

Equation 2

$$\gamma st = \theta st \cdot V/(L(1+A \cdot V2)) \quad (2)$$

where, L is a wheel base of the vehicle, and A is a stability factor.

Further, at 106, at the same time, it is determined whether or not the vehicle is in an oversteer (OS) state or and understeer (US) state. In other words, the turn direction of the vehicle is determined based on whether the detected real yaw rate γ is positive or negative (for example, when γ>0, the vehicle is turning to the left). Then, it is determined whether the vehicle is in the OS state or US state based on whether the vehicle quantity of state is negative or positive and the turn direction. More specifically:

if $SV>0$ when γ>0, then US is determined;

if $SV<0$ when γ>0, then OS is determined;

if $SV>0$ when γ<0, then OS is determined; and if $SV<0$ when γ<0, then US is determined.

At 108, it is determined whether to perform the vehicle behavior control based on whether or not a magnitude |SV| of the vehicle quantity of state SV is larger than a pre-set threshold value SVth. More specifically, depending on the calculation result at 106, a determination will be made like, for example, "vehicle behavior control necessary in a US state during left turn" or "vehicle behavior control unnecessary even given OS state during right turn". If it is determined that vehicle behavior control is necessary at 108, the routine proceeds, and the vehicle behavior control is performed at 110. However, if it is determined that the vehicle behavior control is unnecessary at 108, the routine returns to the processing at 100, and then proceeds through the following processing.

The vehicle behavior control according to the embodiment is performed using a normal control method that is commonly used. A simple explanation of this vehicle behavior control will be given below.

At 110, a target speed reduction amount and a target moment are calculated as control amounts. This control amount is used for stabilization of vehicle behavior, namely, the vehicle state calculated at 106, which is either an OS state or a US state of a certain magnitude during turning to the left or right. At 112, target slip ratios that are necessary for each vehicle wheel FL to RR to achieve the target speed reduction amount and the target moment is calculated.

At 114, control fluid amounts that corresponds to a braking force that needs to be generated for each vehicle wheel FL to RR are calculated based on the vehicle body speed VB and the vehicle wheel speed. The braking force is then generated for each vehicle wheel FL to RR such that the target slip ratio is achieve. Accordingly, the respective vehicle wheel speeds of each vehicle wheel FL to RR are controlled by application of the braking force. A. In other words, the vehicle behavior control according to the embodiment is a control that stabilizes vehicle behavior at the present vehicle body speed VB by realizing the target slip ratio of each vehicle wheel FL to RR through application of braking force to each vehicle wheel FL to RR.

At step 116, respective brake fluid pressures are applied to the respective wheel cylinders 9FL to 9RR of the vehicle wheels FL to RR by the fluid pressure actuator 8, based on the determined control fluid amount. It should be noted that, while the vehicle behavior control is being performed, respective flags are raised that indicate which vehicle wheels the control fluid pressure is being applied to, namely, which vehicle wheels are subject to control (hereinafter referred to as "controlled wheels"). Thus, for example, if the wheel FR alone is not subject to control (hereinafter referred to as a "non-controlled wheel"), the flags are set as Fl, FR, RL, RR=1, 0, 1, 1.

Figure 3:
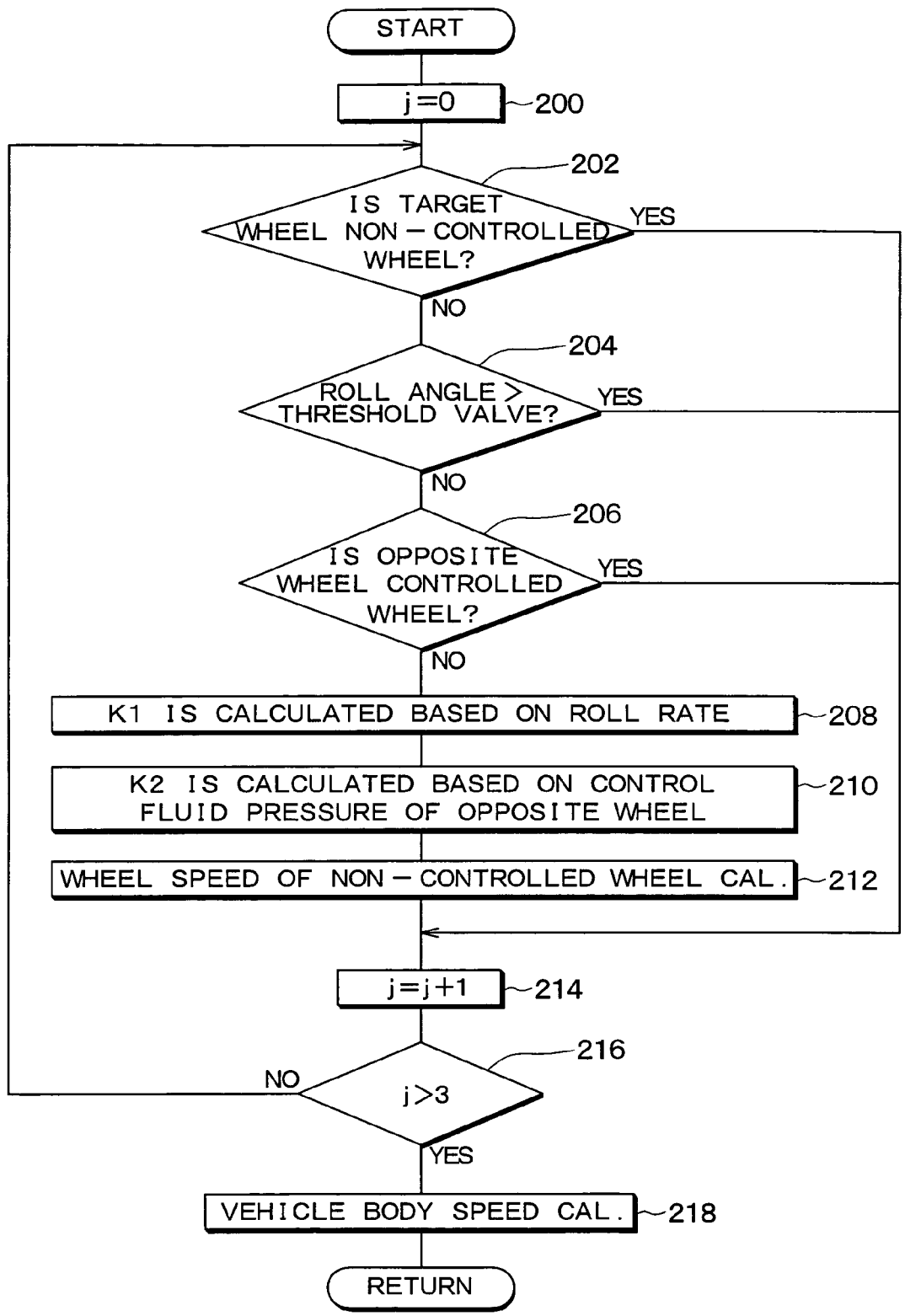
FIG. 3 is a flow chart showing a sub-routine of a vehicle wheel speed correction calculation.

Next, a subroutine of the vehicle wheel speed correction calculation, which is performed at 104, will be explained with reference to the flow chart shown in FIG. 3. Note that, the subroutine described below illustrates an example in which control is performed for respective vehicle wheel speeds of respective drive wheels of a four wheel drive vehicle. Accordingly, this subroutine is performed in sequence for all of the drive wheels, namely, all four wheels. Of course, in the case of a two wheel drive vehicle, the processing may only be performed for a pair of left and right drive wheels.

At 200, the vehicle wheel for which calculation is to be performed (hereinafter referred to as the "calculation-target wheel") is denoted as j=0. In this case, it is the front left vehicle wheel FL. Note that, in the flow chart, j=1, 2, 3 denote the vehicle wheels FR, RL and RR, respectively. At 202, it is determined whether the calculation target wheel for this time (hereinafter referred to as the "present calculation target wheel") is a non-controlled wheel to which the control fluid pressure is not applied. This determination is based on the settings of the flags in the vehicle behavior control performed in the last operation period. If the determination result is NO, namely, the present calculation target wheel is a controlled wheel, there is no need to correct the vehicle wheel speed of the given wheel. Accordingly, the detected vehicle wheel speed VWi is stored as the vehicle wheel speed of the calculation target wheel. Then, at 214, the calculation target wheel is changed to the next wheel (j=j+1). However, if the above determination result is YES, namely, the present calculation target wheel is a non-controlled wheel, it is necessary to correct the vehicle wheel speed of the given wheel. Thus, the routine proceeds to the next processing at 204.

At 204, it is determined whether a magnitude $|\phi|$ of the roll angle $\phi$ calculated at 102 is larger than a pre-set threshold value $\phi$th. If the determination result is NO, namely, if the magnitude $|\phi|$ of the roll angle $\phi$ is equal to or less than the threshold value $\phi$th, there is only a limited need to correct the vehicle wheel speed of the present calculation target wheel since the amount of drive torque being transferred to the given vehicle wheel is small. Accordingly, the detected vehicle wheel speed VWi is memorized as the vehicle wheel speed, and the routine proceeds to the next processing at 214. However, if the above determination result is YES, namely, if the magnitude $|\phi|$ of the roll angle $\phi$ is larger than the threshold value $\phi$th, then it is necessary to correct the vehicle wheel speed of the present calculation target wheel. Thus, the routine proceeds to the next processing at 206.

At 206, it is determined whether the wheel that is positioned opposite to the present calculation target wheel in a left-right direction of the vehicle (hereinafter referred to as the "opposite wheel") is a controlled wheel. This processing is performed based on the settings of the flags in the vehicle behavior control. If it is determined that the opposite wheel is a controlled wheel, the amount of drive torque being transferred to the present calculation target wheel is large, and thus it is necessary to correct the vehicle wheel speed of the present calculation target wheel. On the other hand, if it is determined that the opposite wheel is a non-controlled wheel, the amount of drive torque being transferred to the present calculation target wheel is small, and thus there is no need to correct the vehicle wheel speed of the correction target wheel. Accordingly, the detected vehicle wheel speed VWi is memorized, and the routine proceeds to the next processing at 214.

As is apparent from the above description, the shift to the processing at 208 is performed when the magnitude $|\phi|$ of the roll angle $\phi$ is larger than the threshold value $\phi$th, the calculation target wheel is a non-controlled wheel, and (c) the opposite wheel that is positioned opposite in the left-right direction to the correction target wheel is a controlled wheel.

Figure 4A:
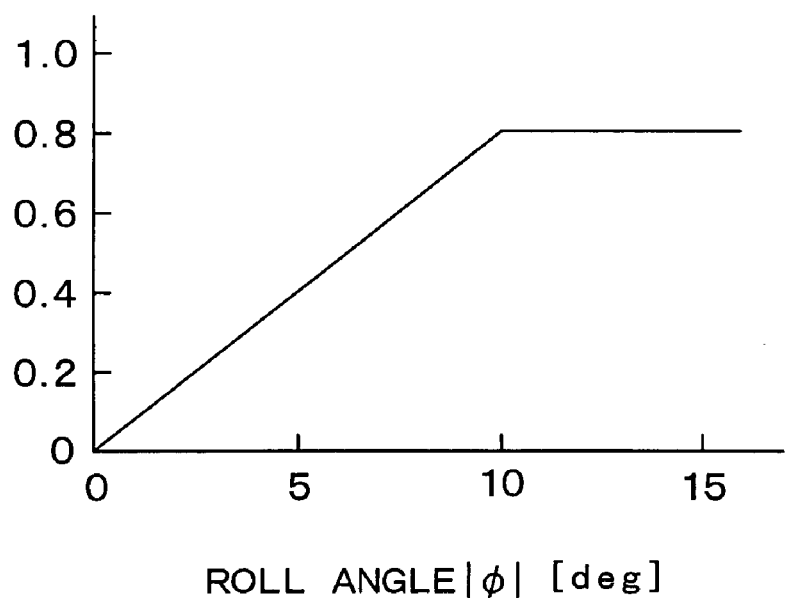
FIGS. 4A and 4B respectively show a map of a coefficient K1, and a map of a coefficient K2.
Figure 4B:
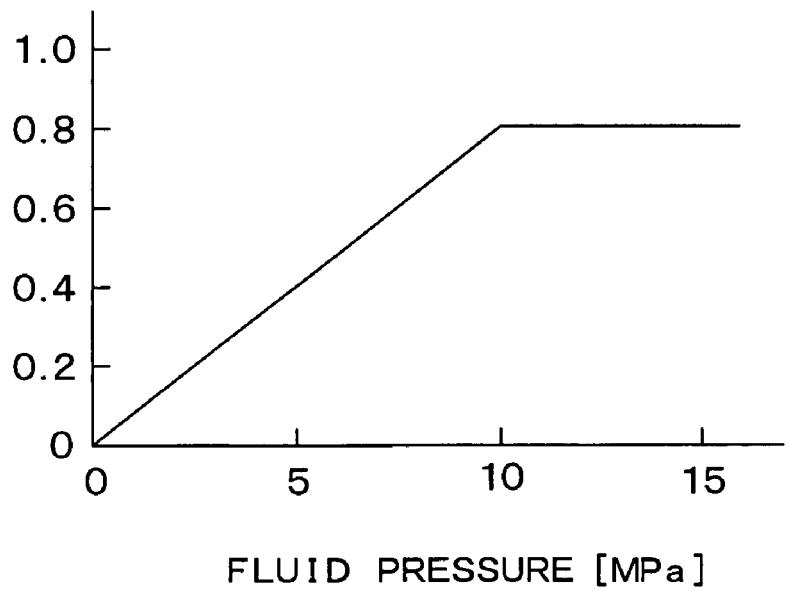

At 208, a coefficient K1 is calculated based on the map shown in FIG. 4A in accordance with the magnitude $|\phi|$ of the roll angle $\phi$. Then, at 210, a coefficient K2 is calculated based on the map shown in FIG. 4B in accordance with the control fluid pressure of the opposite wheel that was determined to be a controlled wheel by the determination at 206. According to this embodiment, the coefficient K1 is smaller than 1, and is set so as to increase along with increase in the magnitude $|\phi|$ of the roll angle $\phi$ when the vehicle is turning in either the left or right direction. Moreover, the coefficient K2 is smaller than 1, and is set so as to increase along with increase in the control fluid pressure of the controlled wheel. Note that, the control fluid pressure of the controlled wheel can be ascertained during the performance of the vehicle behavior control based on the control fluid pressure calculated at 114 during the last operation period.

At 212, the vehicle wheel speed of the calculation target wheel is corrected based on Equation 3 below.

Equation 3

$$VW0^* = VW0 \cdot (1-K) + (VW0 + VW1) \cdot K/2 \quad (3)$$

where, VW0 is the vehicle wheel speed of the calculation target wheel prior to correction (a detected value); VW0* is the vehicle wheel speed of the calculation target wheel following correction; VW1 is the vehicle wheel speed of the opposite wheel that is positioned opposite in the left-right direction (a detected value); and K=K1·K2.

Note that, Equation 3 can be re-written to establish both Equations 4 and 5 below.

Equation 4

$$VW0^* = VW0 \cdot (1-K/2) + VW1 \cdot K/2 \quad (4)$$

Equation 5

$$VW0^* = VW0 + (VW1 - VW0) \cdot K/2 \quad (5)$$

Accordingly, even if the vehicle wheel speed of the calculation target wheel is corrected based on Equation 4 or Equation 5, the same result is obtained.

As the coefficient K of Equation 3 (or Equations 4 or 5) becomes larger (in other words, as the coefficient K1 becomes larger and/or as the coefficient K2 becomes larger), the vehicle wheel speed of the non-corrected wheel is corrected so that it becomes smaller. Accordingly, as indicated by FIG. 4, as (i) the magnitude $|\phi|$ of the roll angle $\phi$ that is the physical quantity corresponding to the vertical load difference of the left and right drive wheels becomes larger, and/or (ii) as the control fluid pressure that acts as the braking force of the controlled wheel that is the opposite wheel among the left and right drive wheels becomes larger, the vehicle wheel speed of the non-controlled wheel that is the other wheel among the left and right drive wheels is corrected so that the vehicle wheel speed becomes smaller. In other words, the slip ratio of the corrected vehicle wheel speed of the non-controlled wheel is made smaller.

At 214, the calculation target wheel is changed to the next wheel. Then, at 216, it is determined whether the above described processing has been performed for all four of the vehicle wheels FL to RR. Once the vehicle wheel speed correction calculation processing has been performed for all of the vehicle wheels FL to RR, at 218, the vehicle body speed VB is calculated by estimation. This estimation calculation of the vehicle body speed VB is performed using (a) the corrected vehicle wheel speed for each of the vehicle wheels FL to RR and (b) a vehicle wheel speed for each vehicle wheel FL to RR which is taken from the detection value and which is non-corrected. The larger value for the vehicle wheel speed among these two wheel speeds (a) and (b) is selected, and set as the vehicle body speed VB. Accordingly, the processing at 218 corresponds to an estimation unit.

As is clear from the above description, with the vehicle wheel speed correction calculation according to the invention, when one of the drive wheels is taken to be a non-controlled wheel and the other is taken to be a controlled wheel, the vehicle wheel speed detection value of the non-controlled wheel is corrected so that the vehicle wheel speed thereof becomes smaller in accordance with the roll angle φ and the control fluid pressure (i.e., the braking force) of the controlled wheel.

When the vehicle is turning, the are occasions when the vertical load of the inside wheel is small due to the roll angle φ being large. In this case, if braking force is applied to the opposite wheel among the left and right drive wheels (i.e., the outside wheel), then drive torque is partially transferred to the inside wheel among the left and right drive wheels, whereby the detection value of the vehicle wheel speed sensor of the inside wheel becomes a value that is larger than the vehicle body speed at the inside wheel position. By using the above described correction calculation, it is possible to correct the vehicle wheel speed detection value of the non-controlled wheel among the drive wheels such that the detection value is nearer to the vehicle body speed at the position of the given wheel.

Moreover, the larger value for the vehicle wheel speed among the vehicle wheel speeds for each wheel, which include the vehicle wheel speed corrected in the above manner, is taken as the vehicle body speed. Accordingly, it is possible to improve the performance of the vehicle behavior control that is performed based on the obtained vehicle body speed.

It should be noted that, with the above described embodiment, the magnitude |φ| of the roll angle φ is adopted as the physical quantity that corresponds to the vertical load difference of the left and right drive wheels. Further, the coefficient K1 is set in accordance with the magnitude |φ| of the roll angle φ. However, the invention is not limited to this configuration, and the lateral acceleration Gy detected by the lateral G sensor 7 may be adopted as the physical quantity corresponding to the vertical load. In this case, it is possible to perform the described vehicle wheel speed correction calculation of the embodiment by making the following changes to the processing of the flow chart shown in FIG. 3.

Namely, (1) at 204, it is determined whether a magnitude |Gy| of the lateral acceleration Gy is larger than a pre-set threshold value; (2) at 208, a coefficient K1' is calculated using a map which has a similar profile to the map of FIG. 4A and which is set in accordance with the magnitude |Gy| of the lateral acceleration Gy; and (3) the coefficient K1 used in the other processing of the routine is changed to the coefficient K1'.

Figure 5:
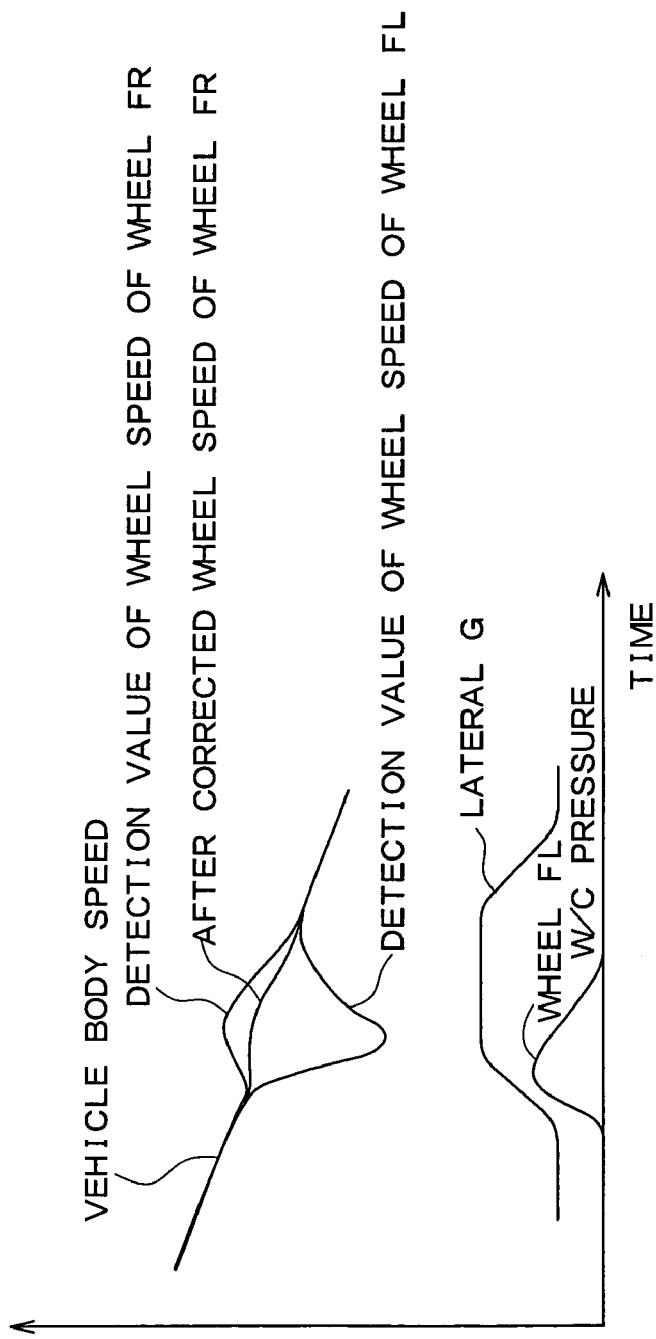
FIG. 5 is a time line chart showing an operation state of the vehicle behavior control apparatus.

FIG. 5 is a time line chart that provides an explanation of the changing state over time of various parameters related to the vehicle wheel speed correction calculation. FIG. 5 illustrates a state in which the vehicle is turning to the right, namely, when high lateral acceleration is acting in the leftward direction, and the front left drive wheel (the FL wheel), which is the outside wheel, is set as the controlled wheel. Accordingly, braking force (W/C pressure) is applied to the controlled wheel by the vehicle behavior control. Further, the front right drive wheel (the FR wheel), which is both the inside wheel and the opposite wheel, is taken to be the non-controlled wheel, and thus no braking force is applied thereto.

When W/C pressure is applied to the vehicle wheel FL by the vehicle behavior control, drive torque is partially transferred to the vehicle wheel FR (that has small vertical load) from the vehicle wheel FL (that has high vertical load). Accordingly, the vehicle wheel speed (the detection value) of the vehicle wheel FL is increased. Note that, the vehicle wheel speed of the vehicle wheel FL is reduced by application of braking force thereto. Further, during turning, lateral acceleration acts on the vehicle body. This lateral acceleration has a value that corresponds to the difference in the vertical loads of the respective vehicle wheels at the outside and the inside of the turn.

Note that, the detected vehicle wheel speed of the vehicle wheel FR can be corrected based on Equation 3 (or Equations 4 or 5) using the coefficient K1' set in accordance with the lateral acceleration Gy, and the coefficient K2 set in accordance with the W/C pressure (the braking force) applied to the vehicle wheel FL. The magnitude of the vehicle wheel speed of the vehicle wheel FR after correction is smaller than the vehicle wheel speed of the detected FR wheel speed. This corrected vehicle wheel speed has a value that is closer to the vehicle body speed.

It should be noted that this embodiment has described an example in which a vehicle behavior control apparatus for stabilizing vehicle behavior is adopted as the braking force control apparatus provided with the vehicle wheel speed estimation device. However, the invention is not limited to this configuration, and, for example, a traction control device that controls drive slip of a vehicle may be utilized as the braking force control apparatus. More specifically, such a traction control device controls braking force such that a slip ratio determined by a vehicle body speed and vehicle wheel speeds becomes a target value. Accordingly, it is important that the vehicle wheel and vehicle body speeds are accurate. Given this, traction control can be effectively performed by utilizing correction of vehicle wheel speed and estimation of vehicle body speed based thereupon, as disclosed in the above embodiment.

While the above description is of the preferred embodiments of the present invention, it should be appreciated that the invention may be modified, altered, or varied without deviating from the scope and fair meaning of the following claims.

What is claimed is:

1. A vehicle wheel speed estimation device provided in a braking force control apparatus which selects at least one vehicle wheel of a vehicle and which applies braking force to a controlled wheel that is the selected vehicle wheel, the vehicle wheel speed estimation device comprising:
   a vehicle wheel speed detection unit for detecting respective vehicle wheel speeds of each of the vehicle wheels;
   a vehicle wheel speed correction unit for performing vehicle wheel speed correction such that, if a pair of drive wheels that are positioned opposite to each other in a left-right direction among the vehicle wheels are taken to be left and right drive wheels, one of the drive wheels being the controlled wheel and the other of the drive wheels being a non-controlled wheel to which braking force is not applied, the vehicle wheel speed correction unit corrects the vehicle wheel speed of the non-controlled wheel that is detected by the vehicle wheel speed detection unit such that the vehicle wheel speed is reduced based upon the braking force applied to the controlled wheel; and
   an estimation unit for estimating the vehicle body speed of the vehicle based on the vehicle wheel speed of the non-controlled wheel, the vehicle wheel speed of the non-controlled wheel being corrected by the vehicle wheel speed estimation device.

2. The vehicle wheel speed estimation device according to claim 1, wherein when a vertical load of the controlled wheel is larger than a vertical load of the non-controlled wheel, the vehicle wheel speed correction unit corrects the vehicle wheel speed of the non-controlled wheel based on a physical amount that corresponds to a vertical load difference of the left and right drive wheels.

3. The vehicle wheel speed estimation device according to claim 2, wherein
   a correction coefficient is set so as to become larger along with increase in the physical quantity, and also become larger along with increase in the braking force applied to the controlled wheel, and
   the vehicle wheel speed correction unit corrects the vehicle wheel speed of the non-controlled wheel such that the vehicle wheel speed becomes lower in accordance with the correction coefficient.

4. The vehicle wheel speed estimation device according to claim 3, wherein the physical quantity that corresponds to the vertical load difference is one of a roll angle and a lateral acceleration of the vehicle.

5. The vehicle wheel speed estimation device according to claim 2, wherein the physical quantity that corresponds to the vertical load difference is one of a roll angle and a lateral acceleration of the vehicle.

6. The vehicle body speed estimation device according to claim 1, wherein the estimation unit takes the vehicle body speed of the vehicle to be the largest value among the corrected vehicle wheel speed of the non-controlled wheel and the respective vehicle wheel speeds of the other wheels.

7. A vehicle behavior control apparatus including the vehicle body speed estimation device as described in claim 6, wherein control of vehicle behavior is performed based on the vehicle body speed estimated by the vehicle body speed estimation device.

8. A vehicle behavior control apparatus including the vehicle body speed estimation device as described in claim 1, wherein control of vehicle behavior is performed based on the vehicle body speed estimated by the vehicle body speed estimation device.

9. A vehicle wheel speed estimation device provided in a braking force control apparatus which selects at least one vehicle wheel of a vehicle and which applies braking force to a controlled wheel that is the selected vehicle wheel, the vehicle wheel speed estimation device comprising:
   a vehicle wheel speed detection unit that detects respective vehicle wheel speeds of each of the vehicle wheels;
   a vehicle wheel speed correction unit that performs vehicle wheel speed correction such that, if a pair of drive wheels that are positioned opposite to each other in a left-right direction among the vehicle wheels are taken to be left and right drive wheels, one of the drive wheels being the controlled wheel and the other of the drive wheels being a non-controlled wheel to which braking force is not applied, wherein the vehicle wheel speed correction unit corrects the vehicle wheel speed of the non-controlled wheel that is detected by the vehicle wheel speed detection unit such that the vehicle wheel speed of the non-controlled wheel is reduced when a vertical load of the controlled wheel is larger than a vertical load of the non-controlled wheel, the correction being based upon a physical quantity that corresponds to a vertical load difference of the left and right drive wheels; and
   an estimation unit for estimating the vehicle body speed of the vehicle based on the vehicle wheel speed of the non-controlled wheel, the vehicle wheel speed of the non-controlled wheel being corrected by the vehicle wheel speed estimation device.

10. The vehicle body speed estimation device according to claim 9, wherein the estimation unit takes the vehicle body speed of the vehicle to be the largest value among the corrected vehicle wheel speed of the non-controlled wheel and the respective vehicle wheel speeds of the other wheels.

11. A vehicle behavior control apparatus including the vehicle body speed estimation device as described in claim 10, wherein control of vehicle behavior is performed based on the vehicle body speed estimated by the vehicle body speed estimation device.

12. The vehicle wheel speed estimation device according to of claim 9, wherein the physical quantity that corresponds to the vertical load difference is one of a roll angle and a lateral acceleration of the vehicle.

13. A vehicle behavior control apparatus including the vehicle body speed estimation device as described in claim 9, wherein control of vehicle behavior is performed based on the vehicle body speed estimated by the vehicle body speed estimation device.

* * * * *